July 12, 1932.  O. L. HARRISON  1,867,073
MEANS FOR HEATING FLATIRONS ON KEROSENE STOVES
Filed June 13, 1929  3 Sheets-Sheet 2
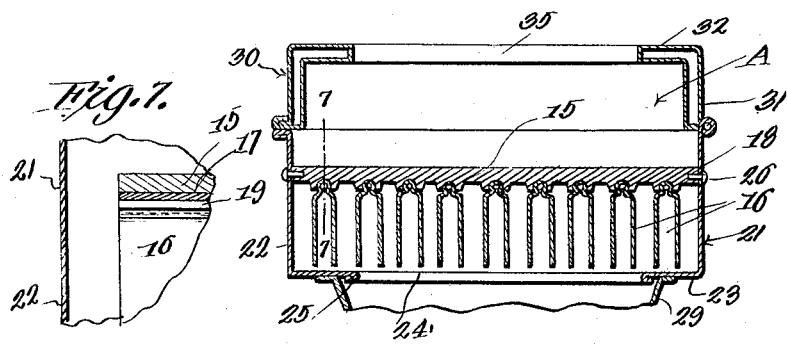
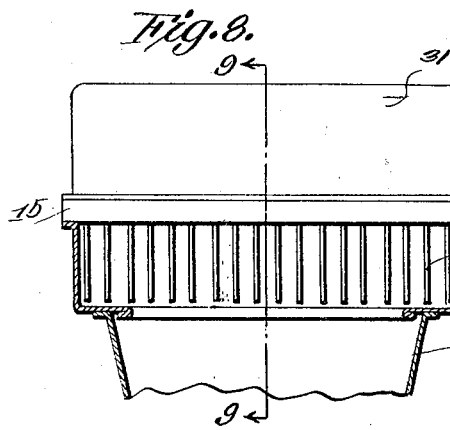
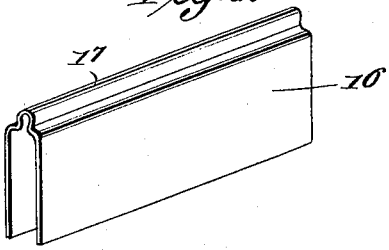
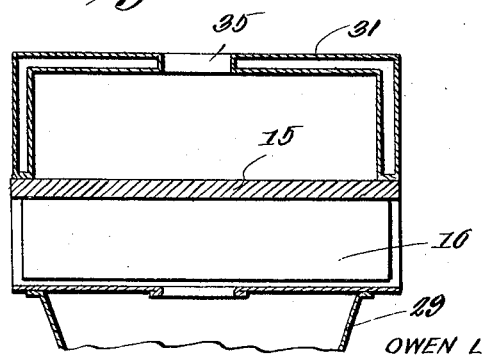
INVENTOR.
OWEN L. HARRISON
BY
Irving L. Cathran
ATTORNEYS.

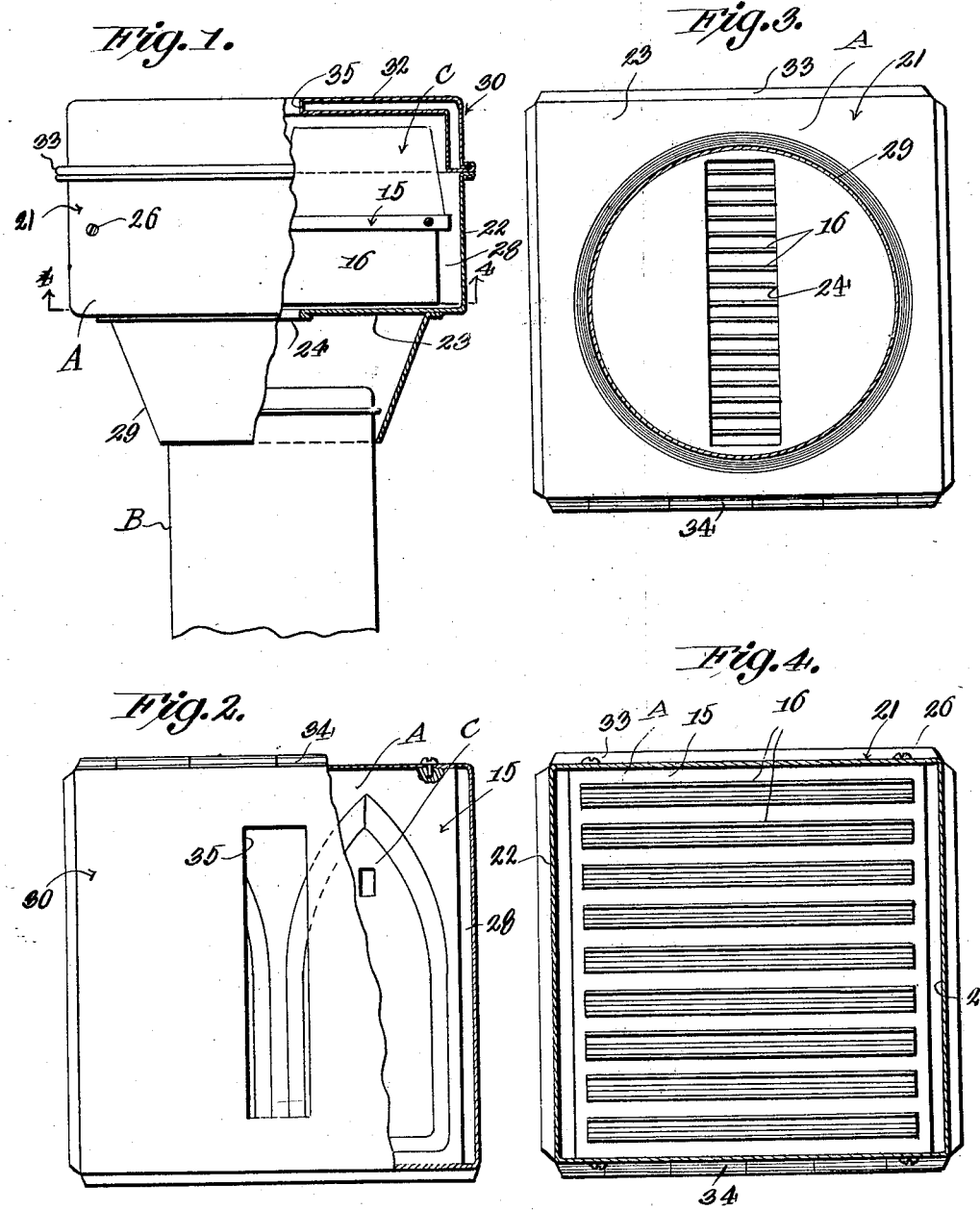

July 12, 1932. O. L. HARRISON 1,867,073
MEANS FOR HEATING FLATIRONS ON KEROSENE STOVES
Filed June 13, 1929 3 Sheets-Sheet 3
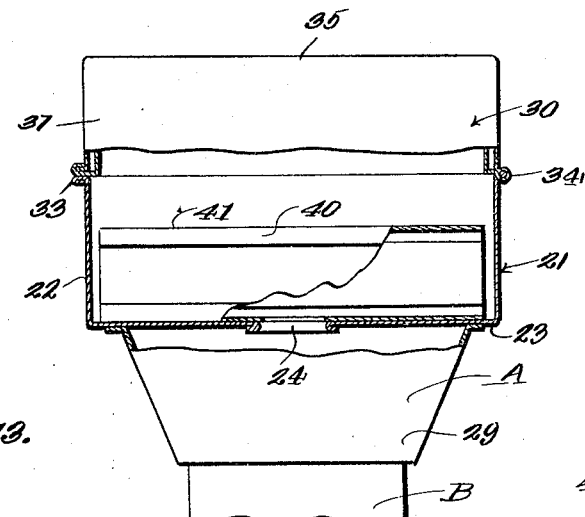
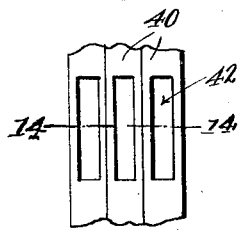
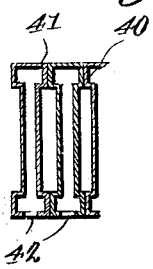
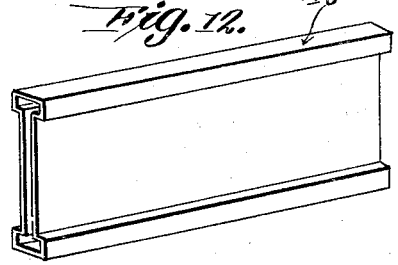
INVENTOR.
OWEN L. HARRISON
BY
ATTORNEYS.

Patented July 12, 1932

1,867,073

UNITED STATES PATENT OFFICE

OWEN L. HARRISON, OF COLETA, ILLINOIS, ASSIGNOR OF TWO-FIFTHS TO SHELBY M. HARRISON, OF NEW YORK, N. Y.

MEANS FOR HEATING FLATIRONS ON KEROSENE STOVES

Application filed June 13, 1929. Serial No. 370,615.

This invention appertains to novel means for quickly heating flat irons on a kerosene or like stove and has for one of its primary objects the provision of a novel device for association with the chimney of a kerosene stove which will effectively and quickly heat a pair of flat irons in a minimum amount of time without smutting the irons in any way, the device being so constructed as to insure the proper and effective use of the heat arising from the burner.

Another important object of my invention is the provision of a metallic plate having a smooth flat upper surface arranged above the burner or chimney of the stove with means depending from the plate for conducting the heat generated from the burner thereto, the plate being adapted to receive the flat irons and form perfect contact therewith, so as to insure the proper transmission of heat from the plate (supplied by said heat conductors) to the irons.

A further object of my invention is the provision of a cover for the irons so as to prevent the radiation of heat from the irons and hold the heat around the irons.

A further object of my invention is the provision of a flat iron heater for kerosene stoves embodying a flat smooth surfaced plate having a plurality of depending relatively thin closely spaced heat distributing fins, the irons to be heated being adapted to contact perfectly with the upper surface of the plate, with means for connecting the plate to the burner or chimney of the stove for protecting the plate and the fins and guiding the heat between the fins and over the plate.

A further object of my invention is the provision of a removable cover for engagement with the heat collector and plate supporting device for further aiding in directing the heat over the irons and for radiating the heat onto the irons.

A still further object of my invention is to provide an improved device of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a side elevation of the improved device, with parts thereof broken away and in section and showing the same applied to the chimney of a kerosene or like stove;

Figure 2 is a top plan view of the improved device with parts thereof broken away and in section;

Figure 3 is a bottom plan view of the improved device;

Figure 4 is a horizontal section taken on the line 4—4 of Figure 1 looking in the direction of the arrows illustrating the heat conducting fins carried by the iron supporting plate;

Figure 5 is a vertical central section through the improved device illustrating the means employed for connecting one form of heat conducting fins with the iron supporting plate;

Figure 6 is a detail perspective view of one of the fins;

Figure 7 is a detail vertical section taken on the line 7—7 of Figure 5 showing the means of connecting one of the fins in place;

Figure 8 is a fragmentary side elevation showing a slightly modified form of my invention;

Figure 9 is a vertical section through the same taken on the line 9—9 of Figure 8 looking in the direction of the arrows;

Figure 10 is a side elevation of a still further modified form of my invention showing parts thereof broken away and in section;

Figure 11 is a vertical section through the same showing the modified form of fins;

Figure 12 is a detail perspective view of the modified form of fins;

Figure 13 is a bottom plan view of a group of fins placed together in proper position, and Figure 14 is a vertical section through the same taken on the line 14—14 of Figure 13.

Referring to the drawings in detail, wherein similar reference characters designate corresponding parts throughout the several views, the letter A generally indicates my improved device and B the chimney of a kerosene stove with which the same can be associated.

The improved device A comprises a metal plate 15 of greater length than width and this plate is preferably formed from aluminum either cast or rolled to the correct form. The top face of the plate is formed perfectly smooth and flat to receive the flat irons C and make a perfect contact therewith to facilitate the transmission of heat thereto. The plate 15 is preferably of such a size as to receive two irons as suggested in Figures 1 and 2 of the drawings. The plate has depending therefrom a plurality of transversely extending heat conducting fins 16, which can be formed of sheet aluminum if preferred. These fins can be of any desired form and secured to the lower surface of the plate 15 in any desired way. As shown in Figures 5 to 7 inclusive, the fins may be constructed in pairs of a substantially U-shaped form in cross section connected together at their upper edges by a bead or rib 17. The lower surface of the plate 15 can be grooved to receive the bead as at 18 and the pairs of fins can be held in place by the use of suitable soft metal rods or wires 19 which can be swedged in place to spread the same laterally by the use of a suitable tool.

The plate 15 can be disposed above the burner or chimney B in any desired way, but I prefer to mount the plate 15 and its fins 16 within a square sheet iron pan 21 which forms a protection therefor. This sheet iron pan 21 includes the upstanding side walls 22 and the bottom wall 23 which is provided at the central portion thereof with an oblong shaped slot 24. The metal around the opening 24 can be folded back as at 25 to eliminate sharp edges and to reinforce the bottom of the pan. As stated, the plate 15 is relatively longer in length than width and the end edges of the plate can abut the opposite side walls 22 of the pan and be secured thereto by the use of suitable rivets or screws 26. The sides of the plate 15 can terminate short of the other walls of the pan and thus form flues 28 on the opposite sides thereof, the fins extending crosswise of the plate with their terminals adjacent to the flues. The lower edges of the fins terminate slightly short of the lower wall 23 of the pan as clearly shown in Figures 1 and 5 of the drawings. The lower wall 23 of the pan 21 can support a depending collar 29 which surrounds the oblong opening 24 and this collar can gradually taper toward its lower end for receiving and fitting over the chimney B.

A cover 30 can be provided for the pan 21, if desired, and this cover includes side walls 31 and a top wall 32 and the meeting edges of the pan and the cover can be rolled to provide abutting beads 33, and if desired, the pan can be hingedly connected to one side wall 22 of the pan 21, as at 34, whereby the cover can be easily swung back to facilitate the placing of the irons or the removing of the irons from the plate 15. The top wall 32 of the cover can likewise be provided with a centrally disposed oblong shaped escape opening 35 which can extend at right angles to the heat entrance opening 24 in the pan.

By this arrangement it can be seen that the heat will be collected by the collar 29 from the chimney B and thence directed against the bottom wall of the pan and up through the heat entrance opening 24 under the plate 15 and between the fins 16; thence out of fins and up the sides of the pan and over the irons being heated and out the escape opening 35. When the cold irons are placed upon the plate 15, the same tend to rob the plate of its heat, but owing to the arrangement of the fins, the same will quickly transmit the heat collected from the chimney and distribute the same evenly to the plate 15. The cover acts to keep the heat from radiating from the irons and also becomes hot and radiates the heat back onto the irons.

With an ordinary long chimney kerosene stove, the usual practice is to light two burners and use three irons. For the first heat, two irons are set on one burner, one on top of the other. When ironing, one iron occupies each burner. It is also necessary to wait on the irons. With my above device, the first heat requires about ten minutes and after that, by the time the iron in use is too cool for ironing, the one in the heater is hot, just under the scorching temperature. Thus, better results are obtained with two irons and one burner than with three irons and two burners in the old way, allowing the ironing to be done more rapidly and with less fuel.

If preferred, the cover 31 can be placed directly on the plate 15 instead of over the pan 21, as clearly shown in Figures 8 and 9 of the drawings. In this instance the pan simply acts as a support for the plate 15 and the heat can escape from the opposite ends of the fins directly into the atmosphere. The main office of the cover in Figures 8 and 9 of the drawings is to hold the heat over the irons and prevent the radiation of the heat therefrom.

It is obvious that the fins can be constructed and held in place in many ways and in Figures 10 to 14 inclusive I have shown another form of fin. In this form the fin indicated by the reference character 40 is of a substantially hollow I-beam construction and when the fins 40 are placed in abutting relation side by side as shown in Figures 11, 13 and 14, the upper faces thereof will form a flat plate 41 on which the irons can rest. These fins can be secured in place in the pan 21 in any desired way and can have the ends thereof spaced from the side walls to permit the heat to flow out of the ends thereof up over the irons through the cover 30. If preferred, the fins 40 at the bottom central portion thereof can be provided with openings 42 to permit the entrance of heat into the same.

The irons may be set on top of the plate either parallel with the fins or at right angles thereto, as may be desired by the user of the irons. It is seen that if the irons are set parallel with the fins, the hot air will naturally flow over the points of the irons more readily than over their sides, which might produce a slight gain in heating effect.

The cover 30 can either be made single walled or double walled, as shown.

Changes in details may be made without departing from the spirit or the scope of this invention, but:

What I claim as new is:

1. A sad iron heating attachment for kerosene and like stoves comprising a relatively deep pan including side walls and a bottom wall having an oblong shaped opening in the bottom portion thereof, a depending collar carried by the bottom wall and surrounding said opening for engagement with the chimney of the burner, a metal plate having a smooth flat upper surface having its sides secured to the side walls of the pan and its ends spaced from the end walls of the pan, a plurality of depending heat conducting fins carried by the lower surface of the plate and terminating short of the lower wall of the pan and arranged transversely of the opening therein, and an apertured cover hingedly carried by the pan for housing the irons.

2. A sad iron heating attachment for kerosene and like stoves comprising a relatively deep pan including side walls and a bottom wall having an oblong shaped opening in the bottom portion thereof, a depending collar carried by the bottom wall and surrounding said opening for engageemnt with the chimney of the burner, a metal plate having a smooth flat upper surface having its sides secured to the side walls of the pan and its ends spaced from the end walls of the pan, a plurality of depending heat conducting fins carried by the lower surface of the plate and terminating short of the lower wall of the pan and arranged transversely of the opening therein, a cover hingedly carried by the pan for housing the irons, the space between the ends of the plate and the end walls of the pan constituting heat escape flues for receiving the heat from between the fins, and the said cover having an opening for escape of the heat in the top wall thereof.

3. A sad iron heating device for kerosene and like stoves comprising a sheet metal pan having an opening in the central portion of its bottom wall, a metal plate having a smooth, flat, upper surface arranged parallel with the bottom wall of the pan, said plate having two opposite edges spaced from the adjacent side walls of the pan to form flues, a plurality of depending heat conducting sheet metal fins fastened to the under side of said plate, said fins extending toward the flues at the opposite ends of said plate, and a cover having a gas escape opening, said cover proportioned to fit the pan and adapted to house the irons and conduct the hot gas around and over the irons.

4. A sad iron heating device for kerosene and like stoves comprising a pan having an opening in the central portion of its bottom wall, a metal plate having a smooth, flat, upper surface arranged parallel with the bottom wall of the pan, said plate having two opposite edges spaced from the adjacent side walls of the pan to form flues, a plurality of depending heat conducting metal fins carried by the lower surface of said plate said fins extending toward the flues at the opposite ends of said plate, a cover proportioned to fit the pan and having a gas escape opening and adapted to house the irons and conduct the hot gas around and over the irons, the opening in the central portion of the bottom wall being of oblong shape and extending transversely of the fins, and a collar carried by the lower wall surrounding the opening.

5. A sad iron heating device for kerosene and like stoves comprising a pan having an opening in the central portion of its bottom wall, a metal plate having a smooth, flat upper surface arranged parallel with the bottom wall of the pan, said plate having two opposite edges spaced from the adjacent side walls of the pan to form flues, a plurality of depending heat conducting metal fins carried by the lower surface of said plate, said fins extending toward the flues at the opposite ends of said plate, a cover having a gas escape opening, said covering proportioned to fit the pan and adapted to house the irons and conduct the hot gas around and over the irons, the opening in the central portion of the bottom wall being of oblong shape and extending transversely of the fins, a collar carried by the lower wall surrounding the opening, and said cover being hingedly connected to said pan.

6. A sad iron heating device for kerosene and like stoves, comprising a sheet metal pan having an opening in the central portion of its bottom wall, a metal plate having a smooth flat upper surface, arranged parallel with the bottom wall of the pan, said plate having two opposite edges spaced from the adjacent side walls of the pan, to form flues, a plurality of depending heat conducting sheet metal fins attached to the lower surface of the plate by fastenings, said fins extending toward the flues at the opposite ends of said plate, and a cover having a gas escape opening, said cover being proportional to fit the pan and adapted to house the irons and conduct the hot gas around and over the irons.

7. A sad iron heating device for kerosene and like stoves, comprising a sheet metal pan having an opening in the central portion of its bottom wall, a metal plate having a smooth flat upper surface arranged parallel with the bottom wall of the pan, said plate having two opposite edges spaced from the adjacent side walls of the pan to form flues, a plurality of depending heat conducting sheet metal fins attached to the lower surface of the plate by fastenings, said fins extending toward the flues at the opposite ends of said plate, a cover having a gas escape opening, said cover being proportional to fit the pan and adapted to house the irons, and conduct the hot gas around and over the irons, and a collar surrrounding the opening in the bottom wall of the pan.

8. A sad iron heating device for kerosene and like stoves comprising a sheet metal pan having an opening in the central portion of its bottom wall, a metal plate having a smooth, flat, upper surface arranged parallel with the bottom wall of the pan, said plate having two opposite edges spaced from the adjacent side walls of the pan to form flues, a plurality of depending heat conducting sheet metal fins fastened to the under side of said plate, said fins extending toward the flues at the opposite ends of said plate, a cover having a gas escape opening, a hinge connection between the cover and said pan, said cover proportioned to fit the pan and adapted to house the irons and conduct the hot gas around and over the irons, rims formed around the edges of said pan and fins formed around the edges of said cover for stiffening the cover and preventing telescoping, the rims on said pan also stiffening the pan and preventing the telescoping thereof.

9. A sad iron heating device for kerosene and like stoves, comprising a sheet metal pan having an opening in the central portion of its bottom wall, a metal plate having a smooth flat upper surface arranged parallel with the bottom wall of the pan, said plate having two opposite edges spaced from the adjacent side walls of the pan to form flues, a plurality of depending heat conducting sheet metal fins carried by the lower surface of said plate, said sheet metal fins being fastened to the plate with mechanical fastenings and extending toward the flues at the opposite ends of said plate, and a cover having a gas escape opening, said cover proportioned to fit the pan and adapted to house the irons and conduct the hot gas around and over the irons, and a collar carried by the lower wall of the pan surrounding the opening.

In testimony whereof I affix my signature.

OWEN L. HARRISON.